(12) United States Patent
Stewart et al.

(10) Patent No.: US 11,221,841 B2
(45) Date of Patent: Jan. 11, 2022

(54) BIOS PERSONALITIES

(71) Applicant: Hewlett-Packard Development Company, L.P., Spring, TX (US)

(72) Inventors: Christopher H Stewart, Spring, TX (US); Valiuddin Ali, Spring, TX (US); Richard Bramley, Mansfield, MA (US); Lan Wang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,742

(22) PCT Filed: Aug. 3, 2018

(86) PCT No.: PCT/US2018/045159
§ 371 (c)(1),
(2) Date: Oct. 19, 2020

(87) PCT Pub. No.: WO2020/027851
PCT Pub. Date: Feb. 6, 2020

(65) Prior Publication Data
US 2021/0240463 A1    Aug. 5, 2021

(51) Int. Cl.
*G06F 9/44* (2018.01)
*G06F 8/65* (2018.01)
*G06F 9/4401* (2018.01)

(52) U.S. Cl.
CPC ............. *G06F 8/65* (2013.01); *G06F 9/4401* (2013.01)

(58) Field of Classification Search
CPC ........................................................ G06F 9/44
See application file for complete search history.

(56) References Cited

U.S. PATENT DOCUMENTS

| | | | |
|---|---|---|---|
| 5,022,077 A | 6/1991 | Bealkowski et al. | |
| 5,844,986 A | 12/1998 | Davis | |
| 6,715,074 B1 | 3/2004 | Chaiken | |
| 8,949,813 B2 | 2/2015 | Wilks et al. | |
| 9,122,501 B1 | 9/2015 | Hsu et al. | |
| 9,875,113 B2 | 1/2018 | Lin | |
| 9,910,991 B2 | 3/2018 | Henry | |
| 2002/0174381 A1* | 11/2002 | Olarig | G06F 9/4401 714/25 |
| 2004/0221150 A1 | 11/2004 | Maynard et al. | |

(Continued)

FOREIGN PATENT DOCUMENTS

CN    102194065 A    9/2011
EP       1072975 A2    1/2001

*Primary Examiner* — Jae U Jeon
(74) *Attorney, Agent, or Firm* — HP Inc. Patent Department

(57) ABSTRACT

In an example implementation according to aspects of the present disclosure, a method may include receiving by a controller a BIOS image, extracting a current manufacturing programming mode state corresponding to a computer system. A BIOS personality of the BIOS image is evaluated, wherein the BIOS personality is based on a differentiation of hardware and software functionality. Based on the current manufacturing programming state and the BIOS personality, a compatibility with the computer system is determined. Based on the compatibility, the BIOS image is written to non-volatile memory.

15 Claims, 4 Drawing Sheets

(56) References Cited

U.S. PATENT DOCUMENTS

| | | |
|---|---|---|
| 2005/0273588 A1* | 12/2005 | Ong .................... G06F 11/1417 713/2 |
| 2006/0179416 A1 | 8/2006 | Watanabe |
| 2007/0255936 A1 | 11/2007 | Stemen |
| 2014/0047428 A1 | 2/2014 | Prakash et al. |
| 2016/0055338 A1* | 2/2016 | Jeansonne ............ G06F 3/0688 713/2 |
| 2017/0168851 A1 | 6/2017 | Lin |
| 2017/0262352 A1 | 9/2017 | Jeansonne et al. |

* cited by examiner

BIOS PERSONALITIES

BACKGROUND

The basic input/output system (BIOS) of a computer system controls fundamental functionality of a computer system. The functionality depends on various sorts of hardware inherent to the computer system as well as functionality within that hardware.

DETAILED DESCRIPTION

Figure 1A:
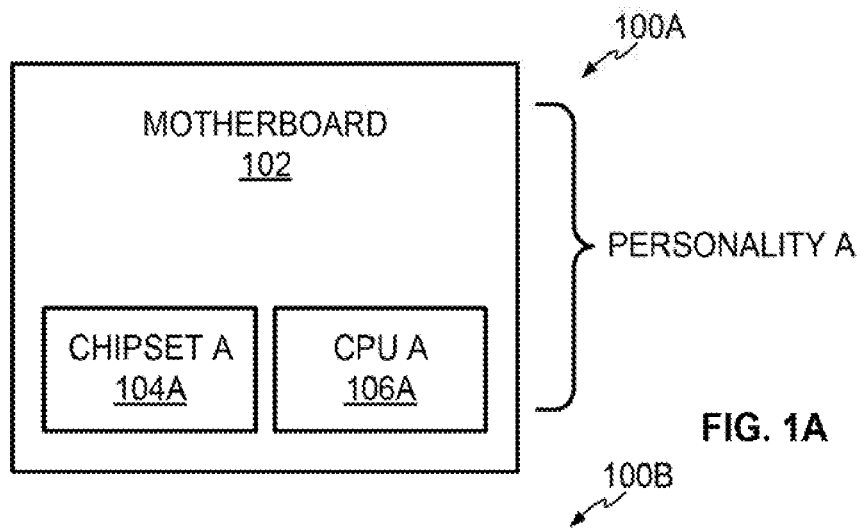
FIGS. 1A, 1B, and 1C illustrate BIOS personalities as implemented in various motherboard configurations, according to an example.

BIOS code size may be restricted by available space on code storage devices. However, the same serial programming interface (SPI) chips that used to store just one megabyte of code plus can now store up to thirty-two megabytes. In the future, this available space will no doubt grow.

Code size restrictions may be important because historically a BIOS could support a very limited number of processors and vendor chipsets due to chipset-specific code required for each processor and motherboard. Supporting multiple processors was difficult with limited code size and supporting multiple chipsets in a single BIOS was very unusual. A single BIOS that can support multiple vendor chipsets is a reality, however each combination of chipset-plus-processor might require a design that excludes other chipset-plus-processor combinations. In this context, this chipset-plus-processor combination is called a BIOS personality. Alternatively, a BIOS personality may include any interchangeable part of the computer system. Any interchangeable part of the computer system can include but is not limited to memory, power supplies, fans, batteries, network cards, video controllers, and serial programming interface (SPI) chips.

A single motherboard can often support multiple different BIOS personalities, but in order to prevent system lock-ups and hypothetical denial-of-service attack vectors, it may be necessary to securely constrain the specific personalities that may be installed onto a particular motherboard. Configurations that allow different BIOS personalities to overwrite one-one another, either adding support for additional BIOS personalities or replacing support for one set of BIOS personalities with another already exist. However, these configurations rely exclusively on manufacturing control flags such as the Manufacturing Programming Mode (MPM) state.

The MPM state is simply a flag that defines a BIOS state. If MPM state is locked, then the BIOS may operate in a trusted environment and may restrict what operations may be performed. If MPM state is unlocked, then BIOS may operate in an untrusted environment with fewer such restrictions. Sometimes the MPM Mode flag is stored less securely (e.g. BIOS NVRAM) or more securely (e.g. Embedded Controller, or EC, private SPI). However, the MPM status is simply a flag, depending on external factors (like electrical isolation in private SPI) for its security.

As describe herein below is a BIOS personality transforming mechanism, in which the incoming BIOS securely identifies itself, through digitally signed metadata, to the installed BIOS, such that the installed BIOS trusts and allows the incoming BIOS to overwrite the installed BIOS. When the incoming BIOS results in a different BIOS personality, we call this a BIOS personality transformation.

Examples disclosed herein are directed to BIOS personality mechanisms to provide the ability to transform the operation of a computer system by the application of a BIOS personality transformation.

Figure 1B:
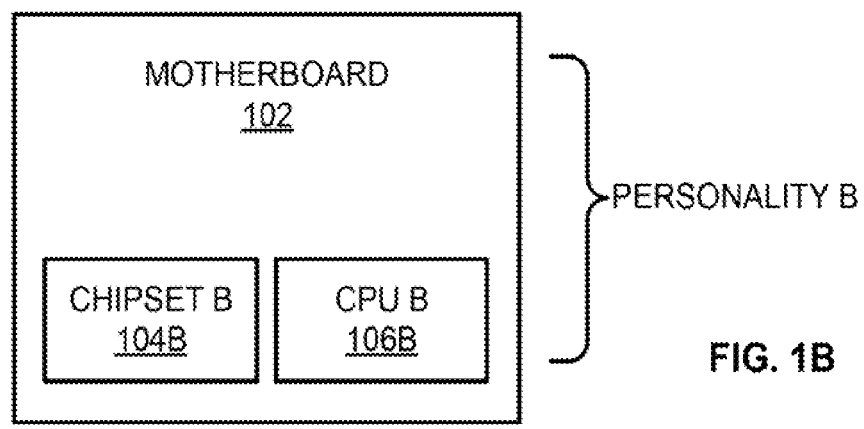
Figure 1C:
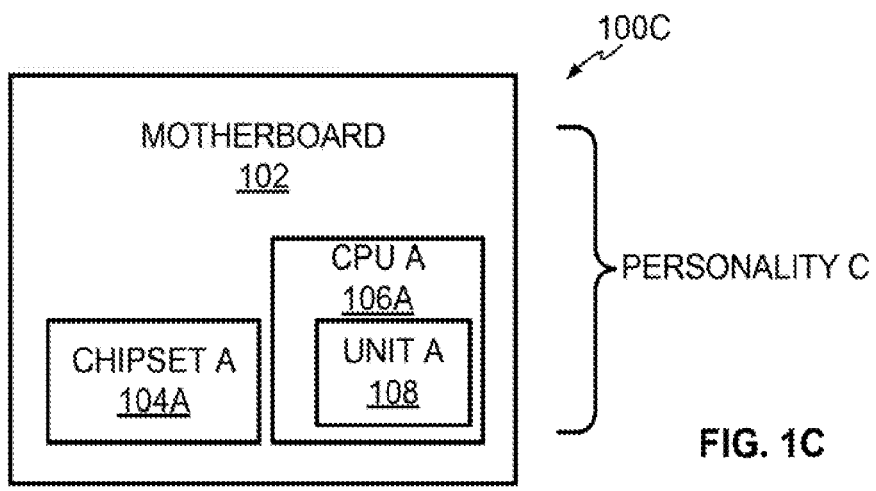

FIGS. 1A, 1B, and 1C illustrate BIOS personalities as implemented in various motherboard configurations 100A, 100B, 100C according to an example. Motherboard configurations 100A, 100B, 100C may include different hardware and software components. Hardware may include different processors, controllers and chipsets. Additionally, hardware combinations may include enabled or disabled functionality. Additional software components may be added to better utilize the hardware components integrated with in the motherboard configurations 100A, 100B, 100C.

The motherboard 102 comprises a main circuit board by which all other internal components of a computing system connect. For example, in one implementation, motherboard 102 is directly connected to a central processing unit (CPU) 106 and chipset 104. Other components are connected to motherboard 102 through secondary connections such as by being built into motherboard 102 or connected through an expansion slot. In other embodiments, other structures may be used to interconnect various internal components of computing system.

Referencing FIG. 1A, a common motherboard 102 may be utilized across all personalities illustrated in FIGS. 1A, 1B, and 1C. In other implementations, the motherboard 102 may take different forms, however with the same or similar functionality (e.g., inputs and outputs) and electrical connectivity. The motherboard 102 may be a printed circuit board designed to conform with industry standard form factors, or alternatively may be custom designed for specific purposes. The motherboard 102 may electrically support any number of chipsets, processors, and input/output (I/O) interfaces. In FIG. 1A, the motherboard 102 may support the combination of chipset A 104A, and CPU A 106A. The combination of CPU A 106A and chipset A 104A may constitute a BIOS personality A.

Referencing FIG. 1B, the BIOS personality includes a CPU B 106B and chipset B 104B. Chipset B 104B may include similar circuit logic to chipset A 104A, where chipset B 104B may support the same CPU families including both CPU A 106A and CPU B 104B, however have different levels of functionality and performance.

Referencing FIG. 1C, the BIOS personality includes a CPU A 106A and chipset A 104A. The CPU A 106A includes a previously inactive processing unit A 108. Processing unit A 108 may be disabled at any point due to performance, security, or data integrity issues. In BIOS personality C, the processing unit A 108 may be activated to provide a new functionality after a maturing of the platform in general. Instances where this approach may be implemented may include brand new processor features with incomplete interfaces at the time of launch as well as undocumented features.

Figure 2:
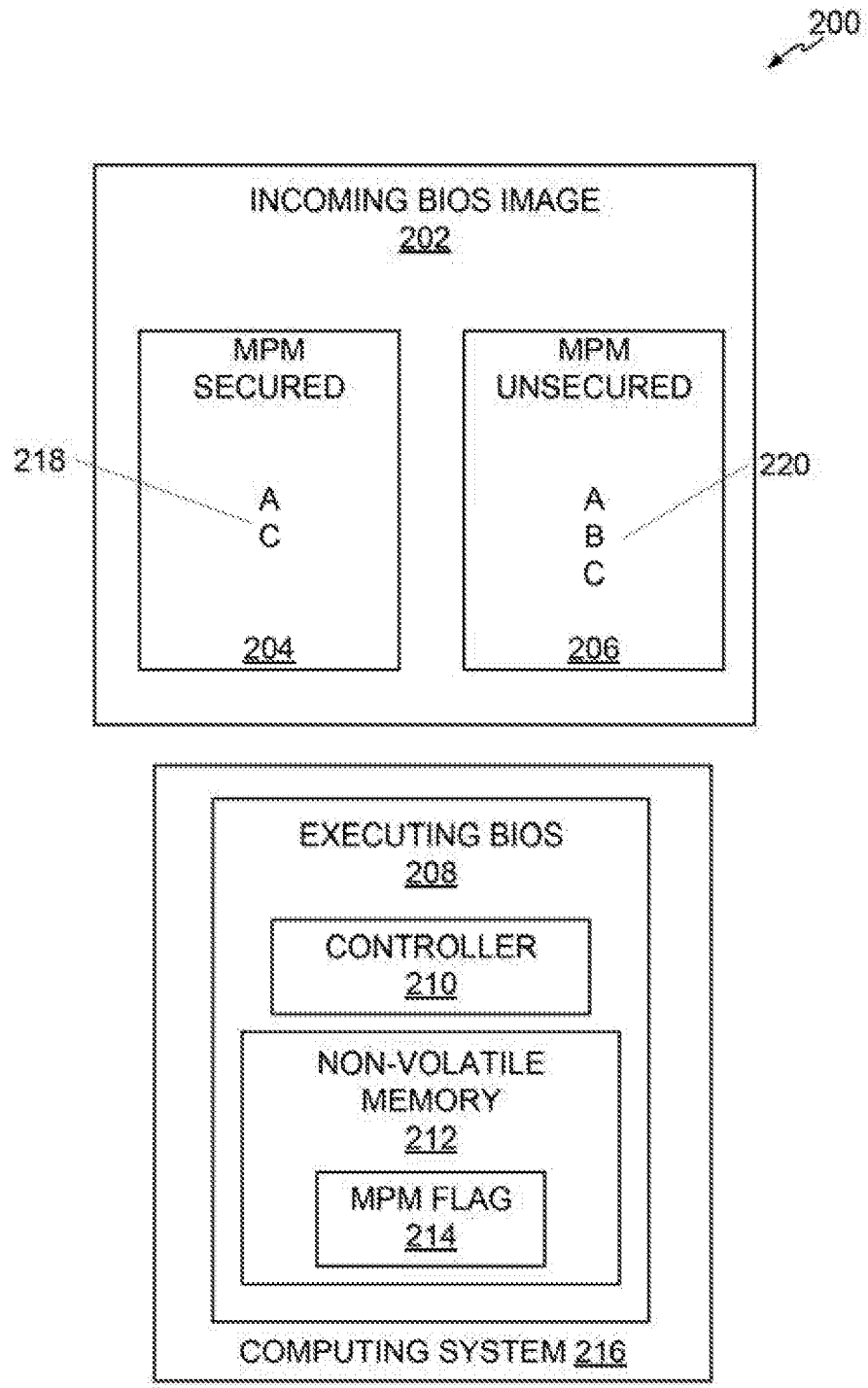
FIG. 2 illustrates a block diagram of a computing system configured to evaluate the BIOS personalities supported by an incoming BIOS image, according to an example.

FIG. 2 illustrates a block diagram 200 of a computing system configured to evaluate the BIOS personalities supported by an incoming BIOS image, according to an example. In FIG. 2, an incoming BIOS image 202 may be examined for BIOS personality compatibility by a computing system 216.

The incoming BIOS image 202 may include digital information relevant to the operation of a BIOS. The incoming BIOS image 202 may include computer readable instructions for security (SEC), pre-EFI initialization environment (PEI), driver execution environment (DXE), boot device selection (BDS), and transient system load (TSL) as BIOS operations. As mentioned above, BIOS images may include support for more than one chipset and accompanying CPUs. As such, the BIOS image may include multiple sets of the above-mentioned computer readable instructions. The multiple sets may include the same relative instructions across the sets, or they may support different instructions set to set. As such, each set may correspond to a BIOS personality in order to support the chipset, CPU, hardware and software functionality combinations. Additionally, redundant code may be eliminated and referenced to save memory space within the incoming BIOS image.

Within the incoming BIOS image 202, a manufacturing programming mode (MPM) secured table 204 may be included. The MPM secured table 204 may include entries corresponding to multiple BIOS personalities 218 "A" and "C" as illustrated in FIG. 2. BIOS personalities 218 correspond to a unique combination of interchangeable components within the system. For example, BIOS personalities "A" and "C" may correspond to supporting the same chipset, but "A" may support a mutually exclusive set of CPUs from "C." The MPM secured table 204 may be used by the controller 210 within the executing BIOS 208 to identify BIOS personalities that are applicable to the motherboard 102 of the computer system 216 when the BIOS is operating in a secured programming mode. In some implementations, the MPM secured table 204 represents the BIOS personalities that are applicable in post-release product maintenance cycles.

Additionally, within the incoming BIOS image, a MPM unsecured table 206 may be included. The MPM secured table 204 may include entries corresponding to multiple BIOS personalities 220 "A", "B", and "C" as illustrated in FIG. 2. As described above, BIOS personalities 220 correspond to a unique combination of interchangeable components within the system. However, BIOS personalities 220 "A", "B" and "C" may be supported in an unsecured mode, thereby providing additional options in a manufacturing environment. The MPM unsecured table 206 may be used to identify BIOS personalities that are applicable to the motherboard 102 of the computer system 216 when the BIOS is operating in an unsecured programming mode. In some implementations, the MPM unsecured table 206 represents the BIOS personalities that are applicable in a manufacturing or development environment. The MPM unsecured table 206 BIOS personalities may include untested or undocumented feature sets that may be applicable in a non-public product release. Additionally, the MPM unsecured table 206 may include BIOS personalities that may be utilized for testing and repair.

Both the MPM secured table 204 and unsecured table 206 may be stored in a digitally signed BIOS metadata section of the incoming BIOS image 202. By storing the MPM secured table 204 and the unsecured table 206 in a digitally signed BIOS metadata section, the executing BIOS 208 may be able to evaluate the authenticity of the incoming BIOS 202 utilizing standard digital encryption/decryption and authentication methods. As such, the executing BIOS 208 may trust the digitally signed BIOS metadata as well as the table and the set of entries within it.

A computing system 216 may include the motherboard 102, any chipset 104A, 104B, and any combination of CPU 104A, 104B. The computing system 216 may also include an executing BIOS 208 for providing basic input and output for the booting and execution of the computing system 216. The computing system 216 may include but is not limited to a personal computer, tablet, mobile phone, Internet of Things (IoT) device, embedded system, or a data center server.

An executing BIOS 208 operates on within the computing system 216 and provides basic functionality for starting a computing system 216 and loading an operating system such as Windows (Windows is a registered trademark of the Microsoft Corporation, Redmond Wash.). An executing BIOS 208 also may include computer readable instructions for receiving an incoming BIOS image 202 and applying it to a non-volatile memory device. The executing BIOS 208 may include a controller 210, a non-volatile memory 212, and an MPM flag 214. In one embodiment, an executing BIOS 208 may be instructions stored, retrieved and executed from a flash memory chip. An executing BIOS 208 may be configured to assist in the startup or boot of computing system 216. In one implementation, an executing BIOS 208 may be configured to perform tasks including, but not limited to, (1) a power-on self-test (POST) for different system hardware components, (2) activating other BIOS chips on different cards installed in computing system 216 such as those found in small computer system interface (SCSI) and graphics cards, (3) managing settings for a disk drive (e.g., a hard disk drive (HDD), a solid-state drive (SSD)), a clock of computing system and the like; and (4) providing a set of low-level routines utilized by an operating system interface to different hardware devices. Such low-level routines or low-level disk services manage interfacing with input, display, and serial and parallel ports.

The controller 210 may provide support for the evaluation of compatible BIOS personalities of an incoming BIOS image 202. The controller 202 may execute instructions for examining the incoming BIOS image 202 and determining a compatibility between the personalities included in an incoming BIOS image and the computer system 216. The controller 210 may also write BIOS configuration details to non-volatile memory, as well as whole or partial compatible BIOS images. The controller 210 may read and execute machine-readable instructions from the non-volatile memory 212.

A non-volatile memory 212 may be utilized for storage of the machine-readable code corresponding to the executing BIOS 208, and also the storage of the incoming BIOS image 202 as it is written. Non-volatile memory 212 may include, but is not limited to, read-only memory (ROM), flash memory, and erasable programmable ROM (EPROM). Additionally, non-volatile memory may be utilized for the storage of computer system-specific values corresponding to the configuration and operation of the system.

A MPM flag 214 corresponds to the current state of the manufacturing programming mode. When a computer system 216 is in a manufacturing or debugging state, the executing BIOS may be put in a MPM unsecured state. The MPM flag 214 expresses the MPM state. The MPM flag 214 may be a value held in non-volatile memory 212, or alternatively the MPM flag 214 may be a circuit design exterior to the executing BIOS 208, but electrically coupled and accessible to the executing BIOS 208. MPM flag 214 may also secure the ability to write or change identifying characteristics of the computer system 216. In some embodiments, the MPM flag 214 indicates that values such as the serial number of the system and the universal unique identifier (UUID) cannot be altered.

Figure 3:
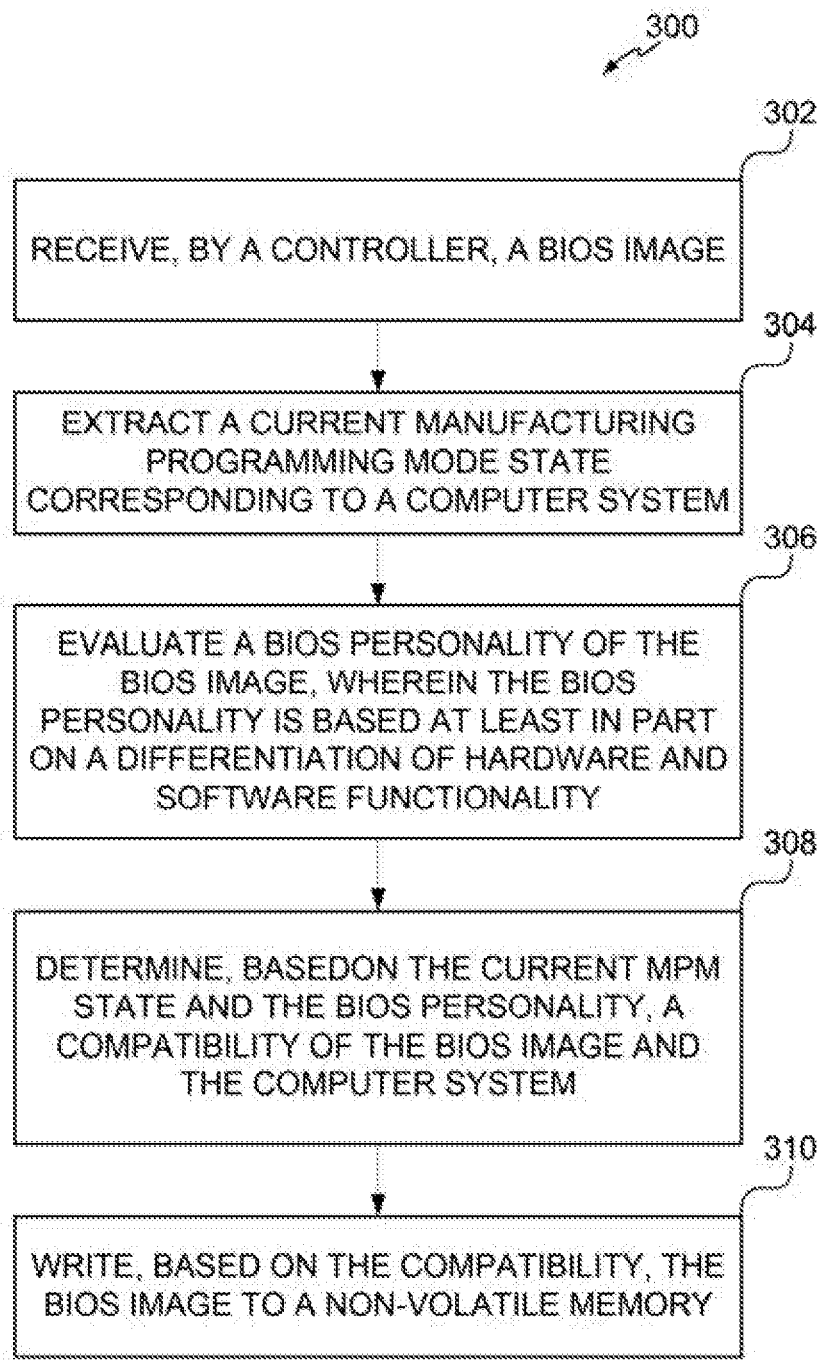
FIG. 3 is a flow diagram illustrating a method to evaluate BIOS personalities supported by an incoming BIOS image, in accordance with an example of the present disclosure.

FIG. 3 is a flow diagram 300 illustrating a method to evaluate BIOS personalities supported by an incoming BIOS image, in accordance with an example of the present disclosure.

At step 302, receive, by a controller, a BIOS image. The BIOS image may correspond to the incoming BIOS image 202. The controller 210 may receive the BIOS image across an interface. Methods for a controller receiving a BIOS image include software BIOS flashing applications, Universal Serial Bus (USB) flashing functionality built into an executing BIOS, and serial programming tools.

At step 304, extract a current manufacturing programming mode state corresponding to a computer system. The controller 210 of an executing BIOS 208 can authenticate a digitally signed metadata segment of an incoming BIOS image 202. The controller 210 may parse the authenticated incoming BIOS image 202 for a table of BIOS personality indicators. The table may correspond to MPM secured systems, MPM unsecured systems, or multiple tables may be utilized for both types of systems. The BIOS personality indicators may be in any digital format that is consistent across BIOS images for that platform. The BIOS personality indicators may be consistently represented across incoming BIOS images as well as in an executing BIOS.

At step 306, evaluate a BIOS personality of the BIOS image, wherein the BIOS personality is based at least in part on a differentiation of hardware and software functionality. The controller 210 may evaluate the BIOS personalities from the incoming BIOS image 202. The controller 210 may temporarily store the BIOS personalities or a portion of the BIOS personalities in memory for evaluation against the current MPM state.

At step 308, determine, based on the current MPM state and the BIOS personality, a compatibility of the BIOS image and the computer system. A BIOS personality compatibility match may be determined by comparing entries of the BIOS personality indicators against a BIOS personality indicator inclusive to the executing BIOS. The controller of the executing BIOS 208 may access a table corresponding to the MPM state in the incoming BIOS image 202. The controller may also locate an entry corresponding to a BIOS personality in the table. The controller of the executing BIOS may compare BIOS personality indicators as presented in entries inclusive to the table corresponding to a manufacturing programming mode state.

At step 310, write, based on the compatibility, the BIOS image to a non-volatile memory. The controller 210 may update the non-volatile memory, with a set of instructions corresponding to the BIOS personality, once the contents of an incoming BIOS image have been determined to be compatible with the computer system. Writing the BIOS image may include overwriting various segments of the non-volatile memory, either partially or completely, to support the hardware functionality (e.g., drivers) and software functionality (e.g., interfaces) of the motherboard.

Figure 4:
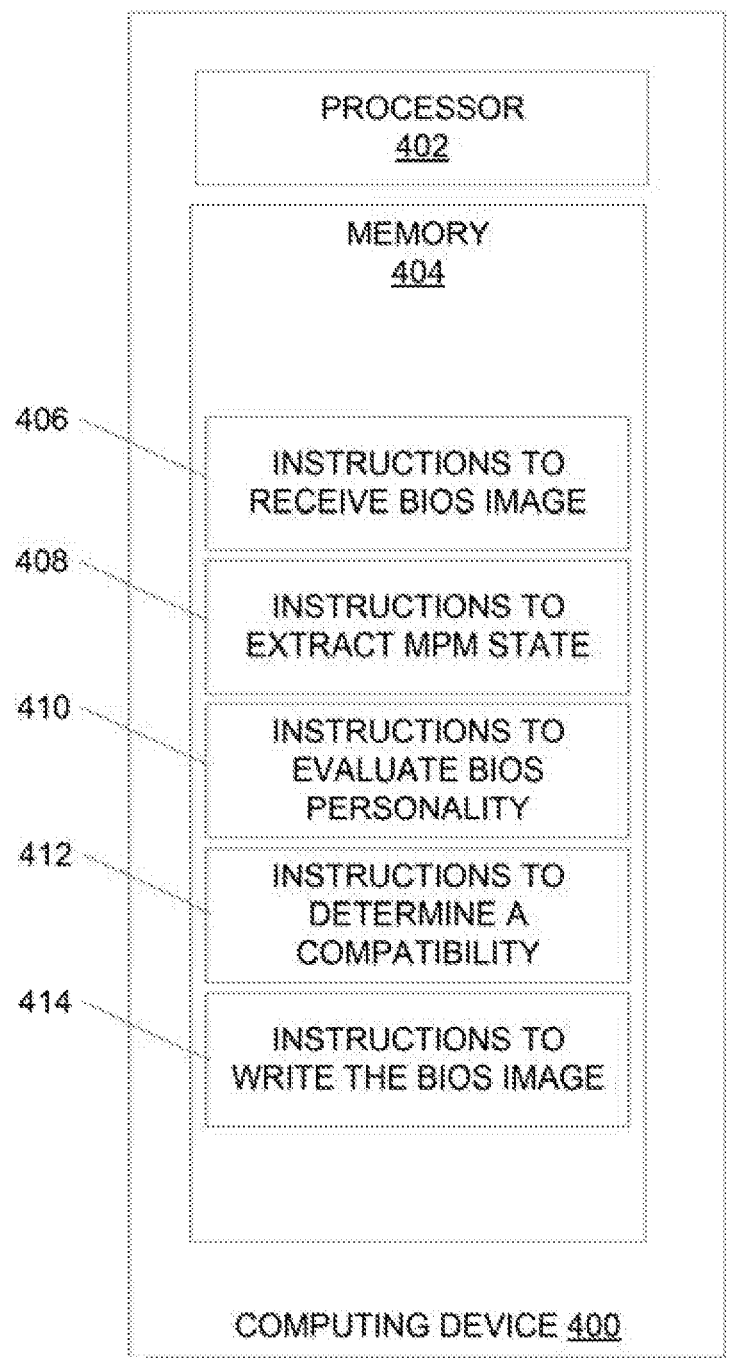
FIG. 4 is a flow diagram illustrating a method for evaluating BIOS personalities supported by an incoming BIOS image, according to an example.

FIG. 4 is a flow diagram illustrating a method for evaluating BIOS personalities supported by an incoming BIOS image, according to an example.

The computing device 400 depicts a processor 402 and a memory device 404 and, as an example of the computing device 400 performing its operations, the memory device 404 may include instructions 406-414 that are executable by the processor 402. Thus, memory device 404 can be said to store program instructions that, when executed by processor 402, implement the components of the computing device 400. The executable program instructions stored in the memory device 404 include, as an example, instructions to receive a BIOS image 406, instructions to extract an MPM state 408, instructions to evaluate a BIOS personality 410, instructions to determine a compatibility 412, and instructions to write the BIOS image 414.

Memory device 404 represents generally any number of memory components capable of storing instructions that can be executed by processor 402. Memory device 404 is non-transitory in the sense that it does not encompass a transitory signal but instead is made up of at least one memory component configured to store the relevant instructions. As a result, the memory device 404 may be a non-transitory computer-readable storage medium. Memory device 404 may be implemented in a single device or distributed across devices. Likewise, processor 402 represents any number of processors capable of executing instructions stored by memory device 404. Processor 402 may be integrated in a single device or distributed across devices. Further, memory device 404 may be fully or partially integrated in the same device as processor 402, or it may be separate but accessible to that device and processor 402.

In one example, the program instructions 406-414 can be part of an installation package that, when installed, can be executed by processor 402 to implement the components of the computing device 400. In this case, memory device 404 may be a portable medium such as a CD, DVD, or flash drive, or a memory maintained by a server from which the installation package can be downloaded and installed. In another example, the program instructions may be part of an application or applications already installed. Here, memory device 404 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
   a non-volatile memory;
   a controller to:

receive a basic input/output system (BIOS) image;
extract a current manufacturing programming mode (MPM) state corresponding to a computer system;
evaluate a BIOS personality of the BIOS image, wherein the BIOS personality is based at least in part on an interchangeable part of the computer system;
access a table, in the BIOS image, corresponding to the MPM state;
locate an entry, in the BIOS image, corresponding to the BIOS personality in the table;
determine, based on the current MPM state and the BIOS personality, a compatibility of the BIOS image and the computer system; and
update, based on the compatibility, the non-volatile memory with a set of instructions corresponding to the BIOS personality.

2. The system of claim 1, wherein the table comprises a set of entries stored in a signed BIOS metadata.

3. The system of claim 2, wherein each entry in the set of entries comprises an identifier corresponding to a BIOS personality.

4. The system of claim 1, wherein the MPM state comprises a secured state and an unsecured state.

5. The system of claim 1, wherein the BIOS personality is based at least in part on a functionality of the chipset.

6. A computing device comprising:
a memory having instructions stored thereon; and
a processor, when executing the instructions, to:
receive a BIOS image;
extract a current manufacturing programming mode (MPM) state corresponding to a computer system;
evaluate a BIOS personality of the BIOS image, wherein the BIOS personality is based at least in part on an interchangeable part of the computer system;
access a table, in the BIOS image, corresponding to the MPM state;
locate an entry, in the BIOS image, corresponding to the BIOS personality in the table;
determine, based on the current MPM state and the BIOS personality, a compatibility of the BIOS image and the computer system; and
update, based on the compatibility, the non-volatile memory with a set of instructions corresponding to the BIOS personality.

7. The computing device of claim 6, wherein the table comprises a set of entries stored in a signed BIOS metadata.

8. The computing device of claim 7, wherein each entry in the set of entries comprises an identifier corresponding to a BIOS personality.

9. The computing device of claim 6, wherein the MPM state comprises a locked state and an unlocked state.

10. The computing device of claim 6, wherein the BIOS personality is based at least in part on a functionality of the chipset.

11. A method comprising:
receiving, by a controller, a BIOS image;
extracting a current manufacturing programming mode (MPM) state corresponding to a computer system;
evaluating a BIOS personality of the BIOS image, wherein the BIOS personality is based at least in part on an interchangeable part of the computer system;
accessing a table, in the BIOS image, corresponding to the MPM state;
locating an entry, in the BIOS image, corresponding to the BIOS personality in the table;
determining, based on the current MPM state and the BIOS personality, a compatibility of the BIOS image and the computer system; and
updating, based on the compatibility, the non-volatile memory with a set of instructions corresponding to the BIOS personality.

12. The method of claim 11, wherein the table comprises a set of entries stored in a signed BIOS metadata.

13. The method of claim 12, wherein each entry in the set of entries comprises an identifier corresponding to a BIOS personality.

14. The method of claim 11, wherein the MPM state comprises a locked state and an unlocked state.

15. The method of claim 11, wherein the BIOS personality is based at least in part on a functionality of the chipset.

* * * * *